United States Patent
Messing et al.

(10) Patent No.: US 11,946,451 B2
(45) Date of Patent: Apr. 2, 2024

(54) METHOD FOR OPERATING A WIND POWER INSTALLATION, WIND POWER INSTALLATION AND WIND FARM

(71) Applicant: Wobben Properties GmbH, Aurich (DE)

(72) Inventors: Ralf Messing, Aurich (DE); Hauke Maass, Bremen (DE); Florian Rubner, Aurich (DE); Christian Möller, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/280,495

(22) PCT Filed: Sep. 26, 2019

(86) PCT No.: PCT/EP2019/076026
§ 371 (c)(1),
(2) Date: Mar. 26, 2021

(87) PCT Pub. No.: WO2020/064925
PCT Pub. Date: Apr. 2, 2020

(65) Prior Publication Data
US 2022/0034296 A1    Feb. 3, 2022

(30) Foreign Application Priority Data
Sep. 28, 2018  (DE) .................... 10 2018 124 084.8

(51) Int. Cl.
F03D 7/02    (2006.01)
F03D 1/06    (2006.01)
(Continued)

(52) U.S. Cl.
CPC ......... *F03D 7/0224* (2013.01); *F03D 1/0633* (2013.01); *F03D 7/0276* (2013.01);
(Continued)

(58) Field of Classification Search
CPC ...... F03D 7/0224; F03D 7/0276; F03D 7/028; F03D 7/048; F05B 2240/3062; F05B 2270/101
See application file for complete search history.

(56) References Cited

U.S. PATENT DOCUMENTS 8,068,939 B2    11/2011  Schmidt
9,051,919 B2 *   6/2015  Jensen ................. F03D 1/0608
(Continued)

FOREIGN PATENT DOCUMENTS

| CN | 101031720 A | 9/2007 |
|----|-------------|--------|
| CN | 101368541 A | 2/2009 |

(Continued)

OTHER PUBLICATIONS

Burton et al., *Wind Energy Handbook*, 2001, 643 pages.
(Continued)

*Primary Examiner* — Viet P Nguyen
*Assistant Examiner* — Thomas K Quigley
(74) *Attorney, Agent, or Firm* — Seed IP Law Group LLP

(57) ABSTRACT

A method for operating a wind power installation for the purpose of generating electrical power from wind, wherein the wind power installation has an aerodynamic rotor having rotor blades that can be adjusted in their blade angle, and the rotor is operated at a settable rated rotor speed, wherein a turbulence class at a site of the wind power installation is determined, and the rated rotor speed is defined in dependence on the determined turbulence class.

19 Claims, 6 Drawing Sheets

(51) Int. Cl.
*F03D 7/04* (2006.01)
*F03D 13/30* (2016.01)

(52) U.S. Cl.
CPC ............ *F03D 7/028* (2013.01); *F03D 7/048* (2013.01); *F03D 13/30* (2016.05); *F05B 2240/3062* (2020.08); *F05B 2270/101* (2013.01); *F05B 2270/322* (2013.01)

(56) References Cited

U.S. PATENT DOCUMENTS

| | | | | |
|---|---|---|---|---|
| 9,422,915 | B2* | 8/2016 | Eisenberg | F03D 1/0675 |
| 9,512,817 | B2* | 12/2016 | Wood | F03D 1/025 |
| 9,567,970 | B2* | 2/2017 | Wood | F03D 1/04 |
| 9,587,628 | B2 | 3/2017 | Narayana et al. | |
| 9,644,613 | B2* | 5/2017 | Erichsen | F03D 1/0675 |
| 9,790,921 | B2* | 10/2017 | Egedal | F03D 7/042 |
| 10,006,438 | B2* | 6/2018 | de Boer | F03D 9/257 |
| 10,060,274 | B2* | 8/2018 | Corten | F01D 5/14 |
| 10,808,676 | B2* | 10/2020 | Harada | F03D 1/0633 |
| 10,914,291 | B2* | 2/2021 | Nielsen | F03D 17/00 |
| 2009/0250937 | A1* | 10/2009 | Stuart | F03D 80/40 |
| | | | | 290/55 |
| 2010/0135789 | A1 | 6/2010 | Zheng et al. | |
| 2011/0229321 | A1* | 9/2011 | Kilaras | F03B 17/061 |
| | | | | 137/561 A |
| 2012/0091713 | A1* | 4/2012 | Egedal | F03D 7/042 |
| | | | | 290/44 |
| 2012/0257978 | A1* | 10/2012 | Jensen | F03D 1/0608 |
| | | | | 416/223 R |
| 2013/0234437 | A1 | 9/2013 | Bjerge et al. | |
| 2013/0280073 | A1* | 10/2013 | Erichsen | F03D 80/30 |
| | | | | 416/146 R |
| 2014/0044535 | A1* | 2/2014 | Wood | F03D 1/0625 |
| | | | | 415/207 |
| 2014/0227092 | A1* | 8/2014 | Wood | F03D 9/25 |
| | | | | 415/207 |
| 2014/0328688 | A1* | 11/2014 | Wilson | F01D 5/02 |
| | | | | 416/223 R |
| 2015/0147175 | A1* | 5/2015 | Stoltenjohannes | F03D 7/048 |
| | | | | 416/37 |
| 2015/0159493 | A1 | 6/2015 | Corten | |
| 2015/0285223 | A1* | 10/2015 | Sanchez | H02J 7/34 |
| | | | | 290/55 |
| 2015/0322917 | A1* | 11/2015 | Eisenberg | F03D 13/30 |
| | | | | 29/401.1 |
| 2016/0305403 | A1 | 10/2016 | Zheng et al. | |
| 2017/0218923 | A1 | 8/2017 | Baba et al. | |
| 2017/0248116 | A1* | 8/2017 | Fukami | F03D 13/10 |
| 2017/0328346 | A1 | 11/2017 | Hales et al. | |
| 2018/0038341 | A1* | 2/2018 | Fukami | F03D 1/0633 |
| 2018/0238303 | A1* | 8/2018 | De Boer | F03D 7/0204 |
| 2019/0120205 | A1* | 4/2019 | Harada | F03D 1/0641 |
| 2019/0277257 | A1* | 9/2019 | Nielsen | F03D 17/00 |
| 2020/0102934 | A1 | 4/2020 | Messing et al. | |
| 2020/0340448 | A1* | 10/2020 | Messing | F03D 7/0276 |
| 2020/0400122 | A1* | 12/2020 | Messing | F03D 7/0276 |
| 2022/0220933 | A1* | 7/2022 | Messing | F03D 13/30 |

FOREIGN PATENT DOCUMENTS

| | | |
|---|---|---|
| CN | 202040024 U | 11/2011 |
| CN | 103306895 A | 9/2013 |
| CN | 103459838 A | 12/2013 |
| CN | 104093973 A | 10/2014 |
| CN | 207297229 U | 5/2018 |
| CN | 108350861 A | 7/2018 |
| CN | 108474345 A | 8/2018 |
| DE | 102008009585 A1 | 8/2009 |
| DE | 102013100387 A1 | 7/2013 |
| DE | 102016124703 A1 | 6/2018 |
| EP | 2128441 A2 | 12/2009 |
| EP | 2518308 A1 | 10/2012 |
| WO | 2018/153518 A1 | 8/2018 |

OTHER PUBLICATIONS

Gasch et al., *Windkraftanlagen: Grundlagen, Entwurf, Planung und Betrieb*, 4. Auflage, 2005, 612 pages (with English machine translation entitled "Wind Turbines: Basics, Design, Planning and Operation, 4th Edition", 435 pages).

Böttcher, *Statistische Analyse der atmosphärischen Turbulenz und allgemeiner stochastischer Prozesse*, Faculty of Mathematics and Natural Sciences, Nienburg, Germany, 2005, 80 pages (with English translation throughout).

International Standard, IEC 61400-1, "Wind turbines—Part 1: Design requirements", 3rd Edition, Aug. 2005, 92 pages.

Manwell et al., *Wind Energy Explained—Theory, Design and Application*, 2nd Edition, 2009, 705 pages.

* cited by examiner

METHOD FOR OPERATING A WIND POWER INSTALLATION, WIND POWER INSTALLATION AND WIND FARM

BACKGROUND

Technical Field

The present invention relates to a method for operating a wind power installation for the purpose of generating electrical power from wind. The present invention furthermore relates to a rotor blade of a rotor of a wind power installation, to a wind power installation and to a wind farm.

Description of the Related Art

Wind power installations are generally known and are designed, for example, as shown in FIG. 1. The design of wind power installations and their components is based on standardized guidelines (e.g., IEC 61400), which deal with the essential design requirements for ensuring the technical integrity of wind power installations. The purpose of this standard is to ensure an appropriate level of protection against damage from risks during the planned service life of the wind power installation. In this case, standard parameters are included in the dimensioning of the wind power installation, which depends on a standardized load but is not site-specific. The standard parameters are, inter alia, shear, the occurrence of turbulences, climatic conditions, air density, reference speeds for wind classes and wind zones.

Wind power installations are subject to a wide variety of environmental conditions depending on their site; in particular, the characteristics of the wind field to which the wind power installations are exposed in diurnal and seasonal changes may differ greatly. The wind field is characterized by a large number of parameters. The most important wind field parameters are average wind speed, turbulence, vertical and horizontal shear, wind direction change over height, oblique incident flow and air density.

Turbulence describes short-term changes in wind speed around an average value in time intervals of less than 10 minutes. This is mainly caused by mechanically and thermally induced turbulences. The vertical shear of the wind field with the earth's surface in this case describes the turbulence caused by fluid mechanics. Thermally induced turbulence, on the other hand, is caused by heat convection, or dissipation. The thermally induced turbulence depends primarily on the thermal stability of the atmosphere. A dimensionless quantity called turbulence intensity is used to describe turbulence. The turbulence intensity is defined as the ratio of the standard deviation of the wind speed to the average value of the wind speed related to time intervals of, in particular, 10 minutes. The turbulence intensity is a measure of the variability of the wind speed within these time periods.

REFERENCES

[1] J. F. Manwell, J. G. McGowan, A. L. Rogers: "Wind energy explained—theory, design and application", $2^{nd}$ edition, John Wiley and Sons Ltd., 2009.
[2] T. Burton, D. Sharpe, N. Jenkins, E. Bossanyi: "Wind energy handbook", John Wiley and Sons Ltd., 2001.
[3] F. Boettcher: "Statistische Analyse der atmosphärischen Turbulenz und allgemeiner stochastischer Prozesse", Dissertation, Carl von Ossietzky Universität Oldenburg, 2005.
[4] R. Gasch, J. Twele: "Windkraftanlagen—Grundlagen, Entwurf, Planung und Betrieb", 4. edition, Teubner Verlag, 2005.

In the priority application relating to the present application, the German Patent and Trade Mark Office has searched the following prior art: US 2017/0328346 A1, DE 10 2008 009 585 A1, DE 10 2013 100 387 A1, US 2017/0218923 A1, US 2010/0135789 A1, EP 2518308 A1, WO 2018/153518 A1, US 2015/0159493 A1.

BRIEF SUMMARY

Provided is a method for operating a wind power installation that is characterized by more efficient operation, but also to specify a rotor blade of a rotor of a wind power installation, a wind power installation and a wind farm that enable more efficient operation. The present invention relates to a method for operating a wind power installation for the purpose of generating electrical power from wind, wherein the wind power installation has an aerodynamic rotor having rotor blades that can be adjusted in their blade angle, and the rotor is operated at a settable rated rotor speed. The present invention furthermore relates to a rotor blade of a rotor of a wind power installation, to a wind power installation and to a wind farm.

Provided is a method for operating a wind power installation. Provided is a method for operating a wind power installation for the purpose of generating electrical power from wind, wherein the wind power installation has an aerodynamic rotor having rotor blades that can be adjusted in their blade angle, and the rotor is operated at a settable rated rotor speed. Efficiency of the method is improved in that a turbulence class at a site of the wind power installation is determined, and the rated rotor speed is defined in dependence on the determined turbulence class.

It is thus proposed to dispense with a uniformly parameterized operation of wind power installations, and to use instead the specific turbulence class determined at a site in order to define the rated rotor speed.

Thus, according to the IEC 61400 guideline, a plurality of turbulence classes are determined on the basis of turbulence intensities. Basically, similar wind power installations, for example of a wind farm, are operated with identical parameters in respect of their operational management at sites that have differing turbulence classes, which has a corresponding effect upon the individual annual energy production (AEP). According to the invention, the adaptation of the operating parameters, in particular the adaptation of the rated rotor speed, therefore means a possible improvement of the AEP.

The rated rotor speed preferably describes the rotational speed of the rotor at which a generator of the wind power installation attains the rated power. Following attainment of this power, the operation of the wind power installation preferably changes to rotational-speed control operation, in which the wind power installation is controlled to the control rotational speed, or rotor setpoint rotational speed. For reasons of system inertia and controller speed, this is preferably 0.1-0.3 rpm above the rated rotor speed. In the context of this disclosure, in the case in which the control rotational speed deviates from the rated rotor speed during operation at rated power, the control rotational speed is referred to synonymously with the rated rotor speed.

According to a second aspect, provided is a method for operating a wind power installation for the purpose of generating electrical power from wind. The wind power installation has an aerodynamic rotor having rotor blades that can be adjusted in their blade angle. The rotor is operated at an in particular settable rated rotor speed, wherein a plurality of vortex generators are arranged on the rotor blades, between the rotor-blade root and the rotor-blade tip. A turbulence class at a site of the wind power installation is determined, and a number and positioning of the vortex generators, in particular their radial extent starting from the rotor-blade root in the direction of the rotor-blade tip, is determined in dependence on the determined turbulence class.

According to a third aspect, provided is a method for operating a wind power installation for the purpose of generating electrical power from wind. The wind power installation has an aerodynamic rotor having rotor blades that can be adjusted in their blade angle. The rotor is operated at an in particular settable rated rotor speed on the basis of a blade angle characteristic. A turbulence class is determined at a site of the wind power installation, and the blade angle characteristic is defined in dependence on the determined turbulence class.

According to a fourth aspect, provided is a method for operating a wind power installation for the purpose of generating electrical power from wind, wherein the wind power installation has an aerodynamic rotor having rotor blades that can be adjusted in their blade angle, and the rotor is operated at a settable rated rotor speed. A turbulence class at a site of the wind power installation is determined, and the wind power installation is operated, in dependence on the turbulence class, according to differing operating characteristics, such that differing power curves are guaranteed in dependence on the turbulence class.

Preferably, the turbulence class may be determined on the basis of a turbulence intensity measured at the wind power installation.

The definition of the rated rotor speed in dependence on the determined turbulence class may in this case be effected in such a manner that the loads to be expected on the rotor due to the measured turbulence intensity are compensated. A higher turbulence intensity causes the loads acting on the rotor to increase. According to the invention, this may be counteracted by lowering the rated rotor speed. To the extent that the rated rotor speed is lowered, the increase in load due to the higher turbulence intensity may be partially, fully or over-compensated.

A lower turbulence intensity, in turn, causes the loads acting on the rotor to decrease. In this case, this may be counteracted according to the invention by raising the rated rotor speed. Owing to the reduction of the loads at lower turbulence intensities, the rated rotor speed may be raised to the extent that the load level is not exceeded at higher turbulence intensities.

Preferably, the turbulence class may be selected from the group that includes "A", "B" and "C". The definition of these turbulence classes may, for example, be selected on the basis of IEC 61400.

The rated rotor speed may thus be defined, with respect to the determined turbulence class, in such a manner that the rated rotor speed is lower for turbulence class "A" than for turbulence class "B", and lower for turbulence class "B" than for turbulence class "C".

Furthermore, a plurality of vortex generators may be arranged on the rotor blades, between the rotor-blade root and the rotor-blade tip, the number and positioning of which, in particular their radial extent starting from the rotor-blade root in the direction of the rotor-blade tip, is determined in dependence on the determined turbulence class. The vortex generators may preferably be known arrangements having fins arranged substantially perpendicularly in relation to a rotor blade surface, for example arranged in pairs on base plates. However, the vortex generators may also be any other passive or active means of influencing the flow, or any combination thereof.

In addition, the number and positioning of the vortex generators along the rotor blade may be determined in dependence on a site-specific air density. A decrease in air density may result in the minimum blade angle having to be raised above a certain power in order to avoid flow separation on the rotor blade, and thus significant yield losses. This may also be counteracted by the adapted radial extent of the assignment of vortex generators, starting from the rotor-blade root in the direction of the rotor-blade tip, for the air density prevailing at the site.

For this purpose, the radial extent of the vortex generators along the rotor blade may be determined in dependence on the air density in such a manner that additional yield losses due to an increase in the blade angle necessary at lower air density are at least partially compensated, preferably are compensated, and particularly preferably are over-compensated. The arrangement of the vortex generators in dependence on the determined air density may have the effect that an increase in the blade angle due to low air density is less, or may even be omitted entirely. An overall increase in yield may thereby be achieved.

In one embodiment, the rated rotor speed is additionally determined in dependence on a site-specific air density.

Preferably, the wind power installation can be operated, in dependence on the turbulence class, according to differing operating characteristics, such that differing power curves are guaranteed in dependence on the turbulence class. This effect may result, especially in the case of wind power installations operated at sites that have low average wind speeds, in the wind power installation delivering more yield at increased turbulence intensity than at lower turbulence intensity, due to the increased frequency of low wind speeds. In particular, in the case of low average wind speeds, a higher yield may be generated when the wind power installation is operated in the higher turbulence class "A" than in the lower turbulence class "B" by adaptation of the operating parameters. In particular, part-load operation, i.e., the range that has an almost constant tip-speed ratio, is relevant here. In the range close to and in the direction of the rated power, there is no constant tip-speed ratio; rather, the tip-speed ratio decreases in this range.

According to a development, a blade angle characteristic may be defined in dependence on the determined turbulence class. It is preferably provided that the rated rotor speed in turbulence class "C" is greater than in turbulence class "B", and in turbulence class "B" is greater than in turbulence class "A". Since there is a lower tip-speed ratio in the case of a lower rated rotor speed, the blade angle is thus increased, according to the blade angle characteristic of the respective turbulence class, in order to avoid a flow separation.

In particular, in the case of a transition from a lower turbulence class to a higher turbulence class, the rated rotor speed may be lowered.

A lowering of the rated rotor speed in this case may be associated with an increase in the blade angle at at least one operating point.

Preferably, instead of the increase in the blade angle at at least one operating point, counter-action may be effected by the design and positioning of vortex generators in such a manner that the lowering of the rated rotor speed remains substantially neutral in respect of yield. There is indeed an increase in the resistance caused by the arrangement of the vortex generators extended in the longitudinal direction of the rotor blade. However, this increase in resistance is outweighed by the advantages of lift generation.

Thus, in the case of the wind power installation designed in dependence on a turbulence class, the assignment of vortex generators to the rotor blades may be increased in a radially outward direction in order, in the case of a lowering in the tip-speed ratio caused by the lowering of the rated rotor speed in the case of a higher turbulence class, to substantially maintain during operation the blade angle of a lower turbulence class.

In particular, the rated rotor speed may also be raised in the case of a transition from a higher turbulence class to a lower turbulence class.

Raising of the rated rotor speed in this case may be associated with a reduction of the blade angle at at least one operating point.

Preferably, instead of the reduction of the blade angle at at least one operating point, the dimensioning and positioning of vortex generators may also be reduced outwards. All measures, individually or in combination, will be able to increase the yield of the installation.

According to a further aspect, provided is a method for operating a wind power installation for the purpose of generating electrical power from wind, wherein the wind power installation has an aerodynamic rotor having rotor blades that can be adjusted in their blade angle, and the rotor is operated at an in particular settable rated rotor speed, wherein a plurality of vortex generators are arranged on the rotor blades, between the rotor-blade root and the rotor-blade tip. A number and positioning of the vortex generators, in particular their radial extent starting from the rotor-blade root in the direction of the rotor-blade tip, is effected in dependence on a site-specific air density.

According to a further aspect, provided is a method for operating a wind power installation for the purpose of generating electrical power from wind, wherein the wind power installation has an aerodynamic rotor having rotor blades that can be adjusted in their blade angle, and the rotor is operated at an in particular settable rated rotor speed, characterized in that closed-loop control of the rotational speed of the wind power installation is effected in dependence on a site-specific air density.

The invention furthermore relates to a rotor blade having a suction side and a pressure side, wherein a plurality of vortex generators are arranged between the rotor-blade root and the rotor-blade tip, wherein the determination of the number and extent of the arrangement of the vortex generators, starting from the rotor-blade root in the direction of the rotor-blade tip, is effected in dependence on a determined turbulence class. The vortex generators are preferably arranged on the suction side and/or the pressure side.

Preferably the extent of the arrangement of the vortex generators, starting from the rotor-blade root in the direction of the rotor-blade tip, i.e., in the longitudinal direction of the rotor blade, may be limited by the highest turbulence class, in particular may decrease from a highest turbulence class to a lowest turbulence class.

The invention furthermore relates to a wind power installation, comprising an aerodynamic rotor having rotor blades that can be adjusted in their blade angle, wherein the rotor can be operated at a settable rated rotor speed, and comprising a closed-loop control system, characterized in that the closed-loop control system is configured to operate the wind power installation according to a method described herein.

For this purpose, the rotor may have at least one rotor blade.

The invention furthermore also relates to a wind farm having a plurality of wind power installations.

BRIEF DESCRIPTION OF THE SEVERAL VIEWS OF THE DRAWINGS

The invention is described in greater detail in the following on the basis of a possible exemplary embodiment, with reference to the appended figures. There are show therein.

DETAILED DESCRIPTION

The invention is explained, on the basis of examples with reference to the figures, in a substantially schematic manner, and the elements explained in the respective figure may be exaggerated therein to aid illustration, and other elements simplified. Thus, in FIG. 1 for example, a wind power installation as such is illustrated schematically, such that a provided arrangement of vortex generators is not distinctly discernible.

Figure 1:
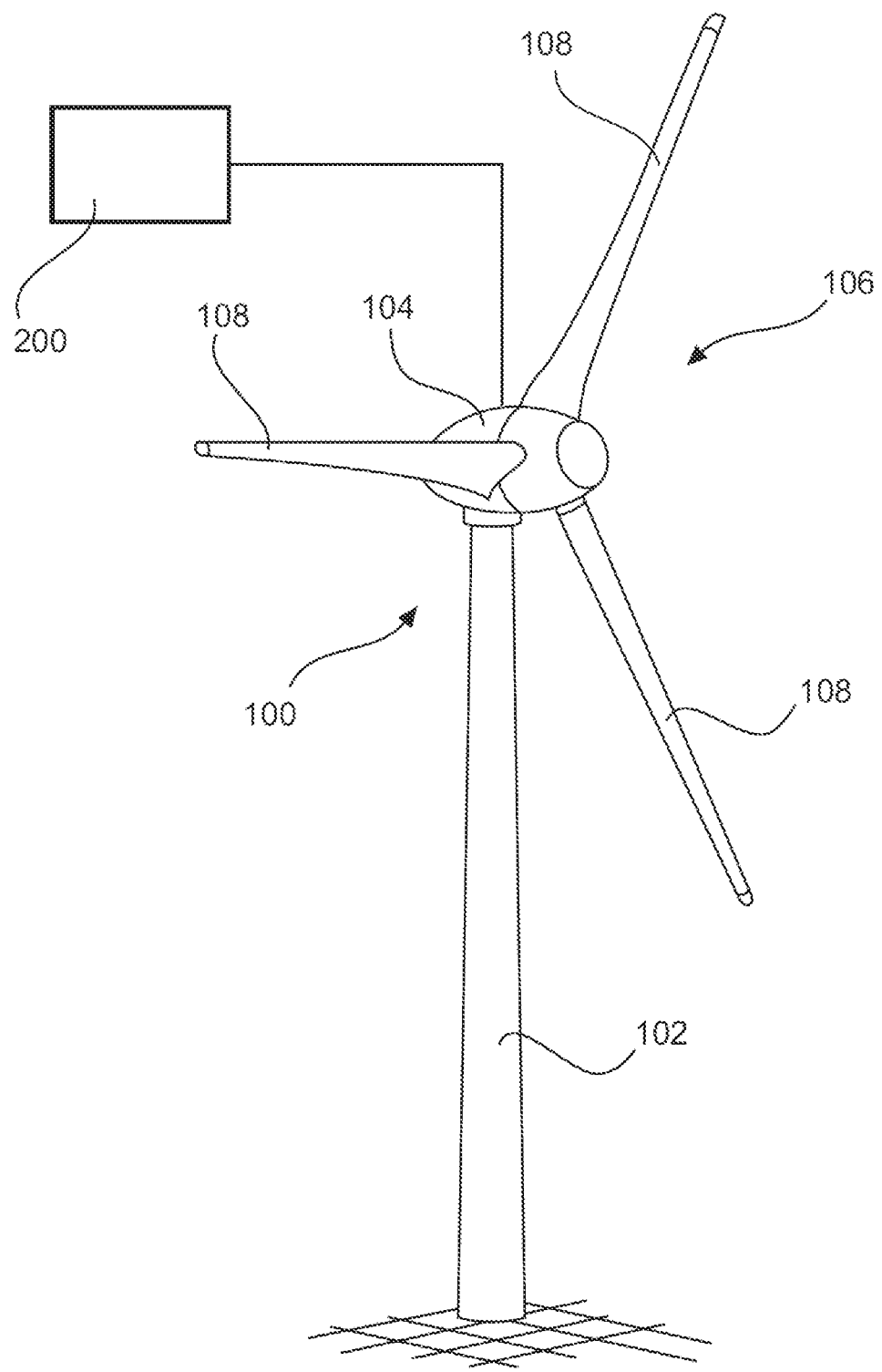
FIG. 1 shows a wind power installation according to the present invention.

FIG. 1 shows a wind power installation 100 comprising a tower 102 and a nacelle 104. Arranged on the nacelle 104 there is a rotor 106 that has three rotor blades 108 and a spinner. When in operation, the rotor 106 is put into a rotating motion by the wind, and thereby drives a generator in the nacelle 104. The rotor blades 108 are settable in their blade angle. The blade angles, or pitch angles, of the rotor blades 108 can be varied by pitch motors arranged at the rotor-blade roots of the respective rotor blades 108. The rotor 106 is operated at a settable rated rotor speed.

A plurality of these wind power installations 100 may form part of a wind farm. The wind power installations 100 in this case are subject to a wide variety of environmental conditions, depending on their site. In particular, the characteristics of the wind field to which the wind power installations are exposed in diurnal and seasonal changes may differ greatly. The wind field is characterized by a large number of parameters. The most important wind field parameters are average wind speed, turbulence, vertical and horizontal shear, wind direction change over height, oblique incident flow and air density.

Turbulence, an important variable influencing the load on the rotor blades 108, describes short-term changes in wind speed around an average value in time intervals of less than 10 minutes. This is mainly caused by mechanically and thermally induced turbulences. The vertical shear of the wind field with the earth's surface in this case describes the turbulence caused by fluid mechanics. Thermally induced turbulence, on the other hand, is caused by heat convection, or dissipation. The thermally induced turbulence depends primarily on the thermal stability of the atmosphere. A dimensionless quantity called turbulence intensity is used to describe turbulence. The turbulence intensity is defined as the ratio of the standard deviation of the wind speed to the average value of the wind speed related to time intervals of 10 minutes. The turbulence intensity is a measure of the variability of the wind speed within these time periods.

Thus, according to the IEC 61400 guideline, sites are divided into a plurality of turbulence classes "A", "B", "C" on the basis of turbulence intensities, as presented in the table below.

| Table of WEA Classes | | | | |
|---|---|---|---|---|
| Wind class | I | II | III | S |
| $V_{ave}$ [m/s] | 10 | 8.5 | 7.5 | Site-specific |
| $I_{15}$ (A) | | 18% | | |
| $I_{15}$ (B) | | 16% | | |
| $I_{15}$ (C) | | 12% | | |

In the table, wind classes I, II, III and S are defined for differing wind speeds. $V_{ave}$ stands for the average wind speed at hub height of the wind power installation 100. $I_{15}$ denotes the percentage turbulence intensity at hub height at a wind speed of 15 m/s. Differing turbulence classes are denoted by "A", "B" and "C".

Sites are divided into the turbulence classes "A", "B" and "C" on the basis of the turbulence intensity $I_{15}$. The turbulence class "A" in this case has a higher turbulence intensity $I_{15}$ than the turbulence class "B", and turbulence class "B" has a higher turbulence intensity $I_{15}$ than the turbulence class "C". Higher turbulences result in higher loads on the rotor 106 and on the rest of the wind power installation 100.

In this exemplary embodiment, the wind power installation 100 is controlled, by closed-loop control, by a closed-loop control system 200, which includes circuitry, such as controllers and processors, for providing control and for processing data, which is part of a comprehensive closed-loop control system of the wind power installation 100. The closed-loop control system 200 will generally be implemented as a part of the closed-loop control system of the wind power installation 100.

Figure 2:
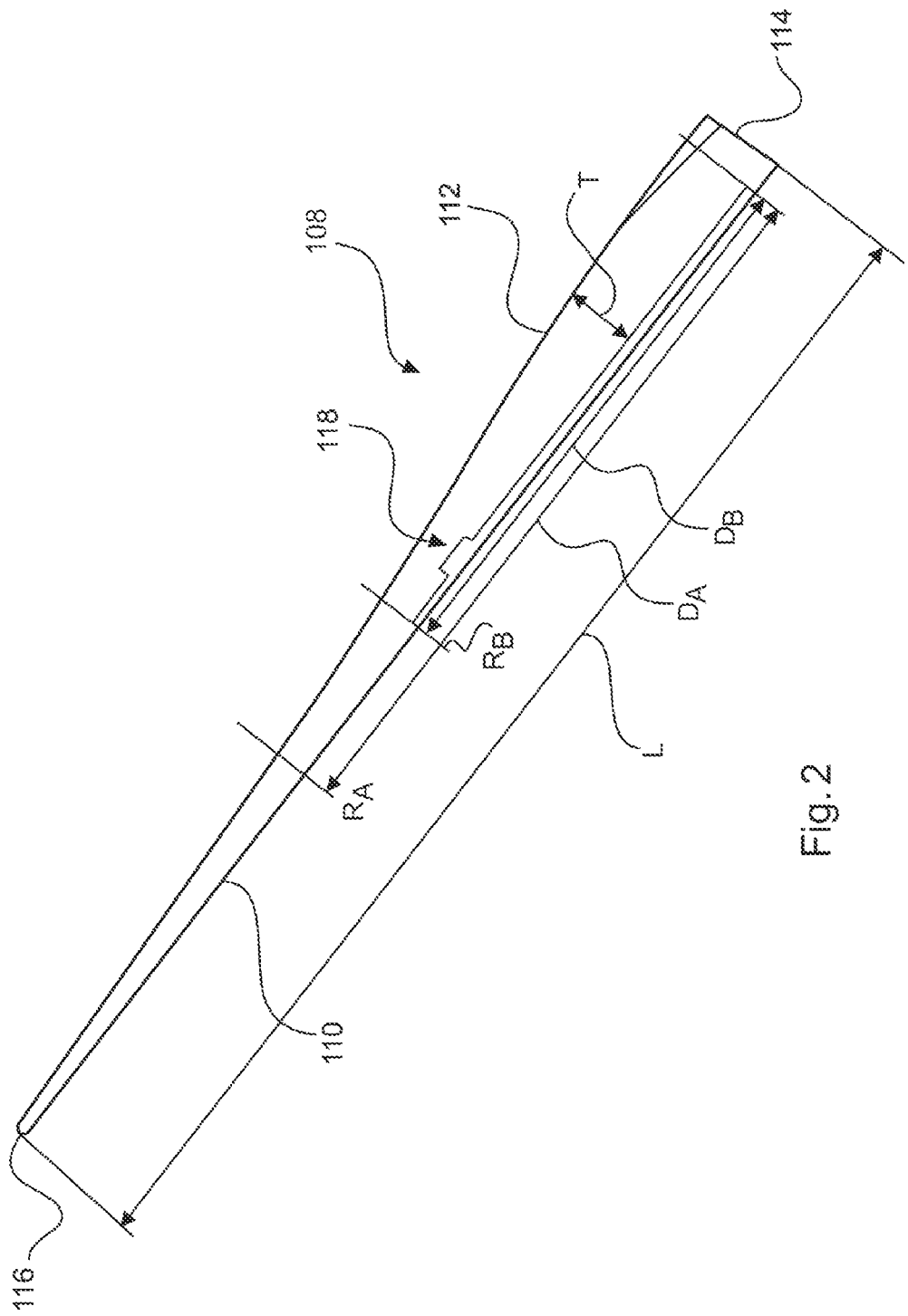
FIG. 2 shows a schematic representation of a rotor blade.

FIG. 2 shows a schematic view of a single rotor blade 108, having a rotor-blade leading edge 110 and a rotor-blade trailing edge 112. The rotor blade 108 has a rotor-blade root 114 and a rotor-blade tip 116. The length between the rotor-blade root 114 and the rotor-blade tip 116 is termed the rotor-blade length L. The distance between the rotor-blade leading edge 110 and the rotor-blade trailing edge 112 is termed the chord T. At the rotor-blade root 114, or in the region close to the rotor-blade root 114 in general, the rotor blade 108 has a large chord T. At the rotor-blade tip 116, by contrast, the chord T is very much smaller. The chord T decreases significantly, starting from the rotor blade root 114, in this example after an increase in the blade inner region, up to a middle region. A separation point (not represented here) may be provided on the rotor blade, preferably in the middle region. From the middle region to the rotor-blade tip 116, the chord T usually decreases steadily, almost constantly, or the decrease in the chord T is significantly reduced.

The representation in FIG. 2 shows the suction side of the rotor blade 108. Arranged on the suction side are vortex generators 118, which may be realized, for example, as base plates having two fins extending from them. Alternative designs of the vortex generators 118 as active or passive elements for influencing flow are conceivable. While in the example the vortex generators 118 are shown arranged on the suction side of the rotor blade 108, alternatively or additionally vortex generators 118 on the pressure side are also possible. Arranging of the vortex generators 118 is effected in the region of the rotor-blade leading edge 110. The extent of the arrangement of the vortex generators 118 begins in the region of the rotor-blade root 114 and runs in the direction of the rotor-blade tip 116. With respect to the rotor 106, the vortex generators 118 extend in the radial direction over a distance $D_A$, or $D_B$, to a position $R_A$, or $R_B$, respectively, on the rotor blade 108. Thus, the distance $D_B$ may be up to about 40% of the rotor-blade length L, while the distance $D_A$ may be up to about 60% of the rotor-blade length L. The distance $D_A$, or $D_B$, in this case depends on the turbulence class "A", "B", "C" in which the wind power installation 100 is to be operated. The relationships in this regard are discussed in greater detail in the description below. The values of $D_A$ and $D_B$ are to be understood as exemplary, with values significantly closer to the rotor-blade tip 116 also being possible, in particular up to and including the rotor-blade tip 116.

In the hub region of the rotor 106 the vortex generators 118 have the effect that, in the case of the profiles of the rotor blades 108 provided there, having a high relative profile thickness, the profiles can receive incident flow with comparatively high effective angles of attack $\alpha_{eff}$, especially when the surface is dirty, without separation phenomena of the flow occurring as the flow passes around the profile. The profile of the rotor blade 108 provided with vortex generators 118 shifts the flow separation to higher angles of attack. This results in comparatively high lift values compared to a profile that is not equipped with vortex generators. Vortex generators 118 ultimately have the effect that the wind power installation 100 behaves robustly in respect of influences of weather and environment, such as rain or increased soiling of the rotor blades by dirt or insects.

For efficient operation of the wind power installation 100, it is provided that the turbulence class be determined at a site of the wind power installation 100, and that the rated rotor speed be defined in dependence on the determined turbulence class "A", "B" or "C". In this case, a uniformly parameterized operation of the wind power installations 100 of a wind farm is dispensed with. Instead, the specific turbulence class "A", "B" or "C" determined at a site is used for defining the rated rotor speed. Operating the wind power installation in a higher turbulence class "A", "B", "C" may be more efficient, since the electrical power P that can be generated in the partial load range is greater at higher turbulence intensity $I_{15}$ than at lower turbulence intensity $I_{15}$. The advantageous effect of the solution according to the invention is particularly pronounced in the case of weak-wind turbines, which attain rated power even at relatively low wind speeds.

Figure 3:
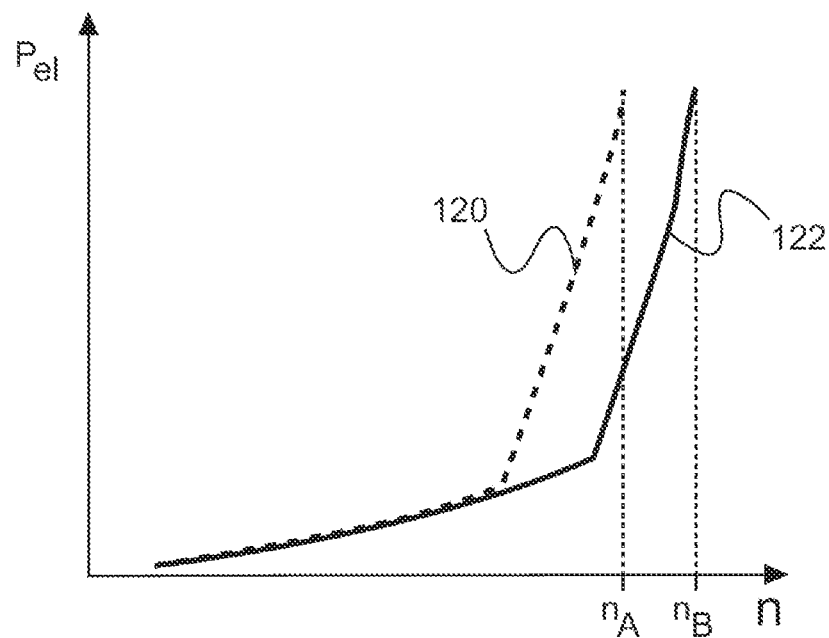
FIG. 3 shows a schematic representation of examples of operating characteristics for differing turbulence classes.

FIG. 3 shows a schematic representation of examples of operating characteristics 120, 122 only for two differing turbulence classes "A" and "B". The rotor speed n is plotted on the horizontal axis, and the electrical power P on the vertical axis. The operating characteristic 120 represents the operation of the wind power installation 100 in turbulence class "A". The operating characteristic 122 represents the operation of the wind power installation 100 in turbulence class "B". In the turbulence class B, the wind power installation 100 is operated at a rated rotor speed $n_B$, and in the turbulence class A it is operated with a rated rotor speed $n_A$, the rated rotor speed $n_B$ being greater than the rated rotor speed $n_A$. Lowering of the rated rotor speed $n_B$ to the rated rotor speed $n_A$ results in a reduction in load. The increase in load due to the higher turbulence intensity $I_{15}$ associated with the transition to operation in the higher turbulence class may thus be partially, fully or overcompensated. The order of magnitude of the compensation in this case depends on the reduction in the rated rotor speed. Alternatively, increasing the rated rotor speed $n_A$ to the rated rotor speed $n_B$ results in an increase in load. Increasing of the rated rotor speed may therefore be effected to the extent that the loads are reduced upon the transition from the higher turbulence intensity $I_{15}$ to the lower turbulence intensity, and overall the load level is not exceeded at higher turbulence intensity and reduced rated rotor speed.

Figure 4:
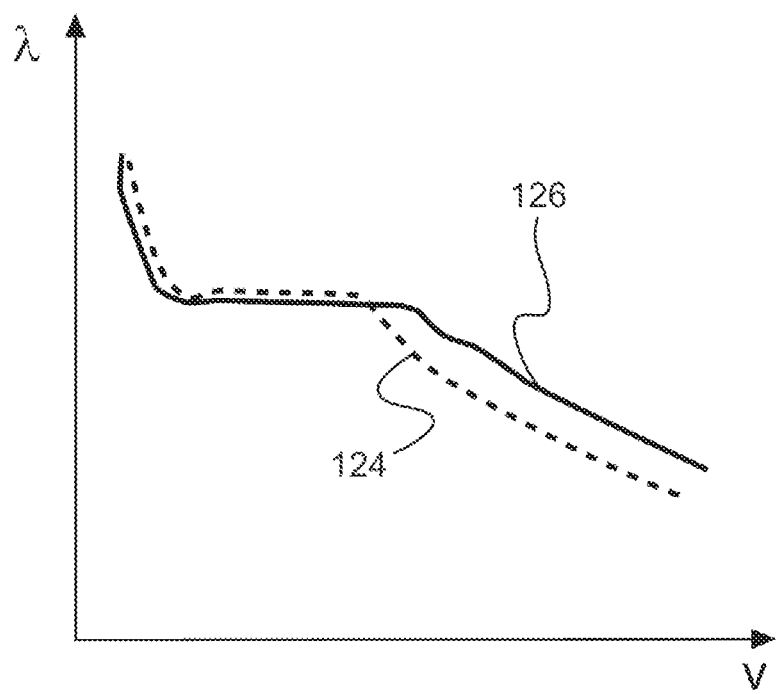
FIG. 4 shows a schematic representation of examples of variations of tip-speed ratios for differing turbulence classes.

FIG. 4 shows a schematic representation of examples of variations of tip-speed ratios λ for the differing turbulence classes "A", "B". The tip-speed ratio λ describes the ratio of circumferential speed to undisturbed incident-flow speed v of the wind. The exemplary variation 124 is obtained in the case of operation in the turbulence class "A", and variation 126 is obtained in the case of operation in the turbulence class "B". Lowering of the rated rotor speed from the rated rotor speed $n_B$ to the rated rotor speed $n_A$ results, above a certain wind speed, in lesser tip-speed ratios λ at which the wind power installation 100 is operated, which affects the generated power.

Figure 5:
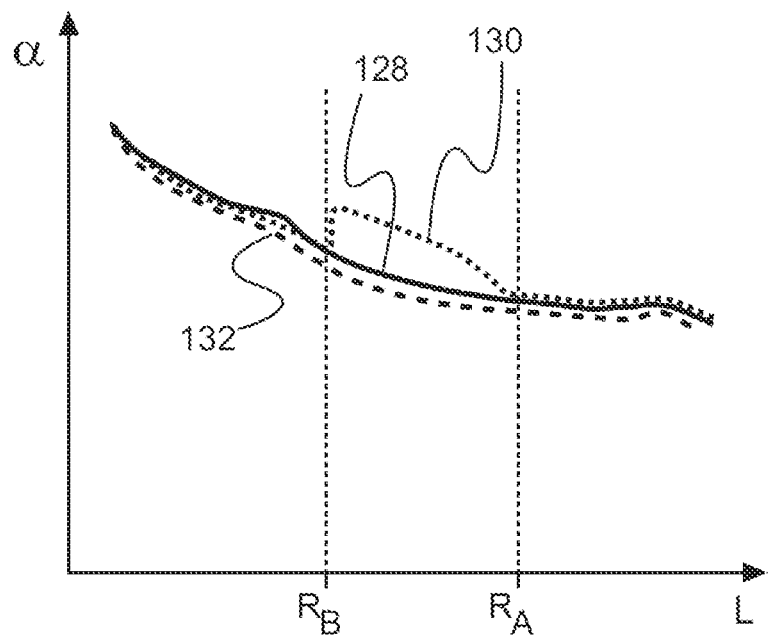
FIG. 5 shows a schematic representation of examples of variations of angles of attack for differing turbulence classes.

FIG. 5 shows a schematic representation of examples of variations 128, 130, 132 of effective angles of attack $\alpha_{eff}$ for differing turbulence classes "A", "B". The effective angle of attack $\alpha_{eff}$ is plotted on the vertical axis. The length L of the rotor blade 108 is plotted on the horizontal axis. The variation 128 shown is obtained in the case of operation of the wind power installation 100 in turbulence class "B". A plurality of the vortex generators 118 are arranged, starting from the rotor-blade root 114, in the direction of the rotor-blade tip 116. The number and positioning of the vortex generators 118, in particular their radial extent over the distance $D_B$ as far as the position $R_B$, is determined in dependence on the turbulence class "B" determined at the site of the wind power installation 100.

The variation 130 for the effective angle of attack $\alpha_{eff}$ is obtained when operation of the wind power installation 100 is changed from the turbulence class "B" to turbulence class "A", the radial extent of the arrangement of vortex generators 118 reaching unchanged up to maximally the position $R_B$, which is determined by the turbulence class "B".

Finally, the variation 132 is obtained when operation of the wind power installation 100 is changed from the turbulence class "B" to turbulence class "A", the radial extent of the arrangement of vortex generators 118 having been adapted to the turbulence class "A" and now reaching maximally up to the position $R_A$.

Figure 6:
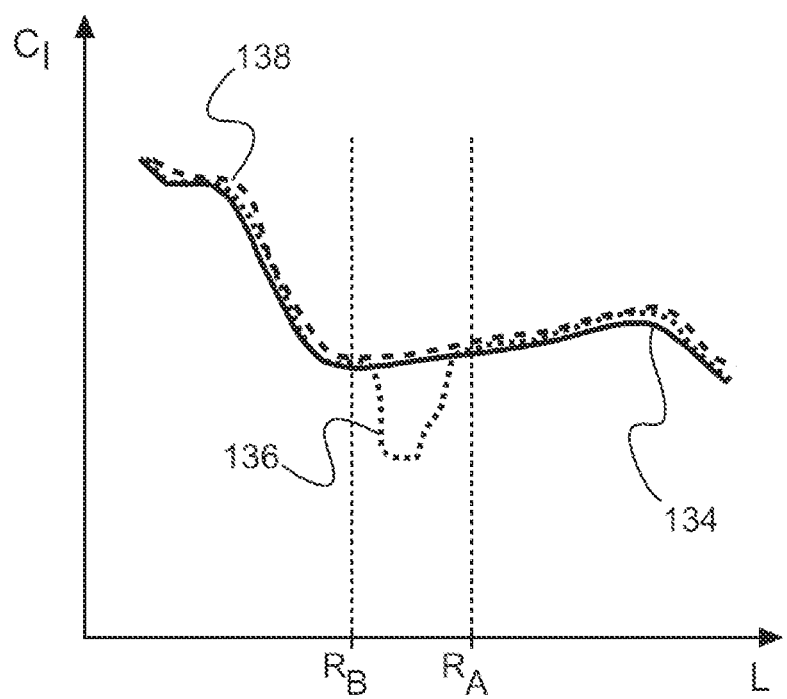
FIG. 6 shows a schematic representation of examples of variations of lift coefficients for differing turbulence classes.

FIG. 6 shows a schematic representation of examples of variations 134, 136, 138 of lift coefficients ci for the two differing turbulence classes "A" and "B". The lift coefficient ci is plotted on the vertical axis. The length L of the rotor blade 108 is plotted on the horizontal axis. The variation 134 is obtained in the case of operation of the wind power installation 100 in turbulence class "B", with the vortex generators 118 extending radially to the position $R_B$ on the rotor blade 108. The variation 136 is obtained when the operation of the wind power installation 100 is changed from the turbulence class "B" to the turbulence class "A, the radial extent of the vortex generators 118 reaching unchanged up to maximally the position $R_B$. The variation 138 is obtained when operation of the wind power installation 100 is changed from the turbulence class "B" to turbulence class "A", the radial extent of the vortex generators 118 having been adapted to the turbulence class "A" and now reaching maximally up to the position $R_A$.

Figure 7:
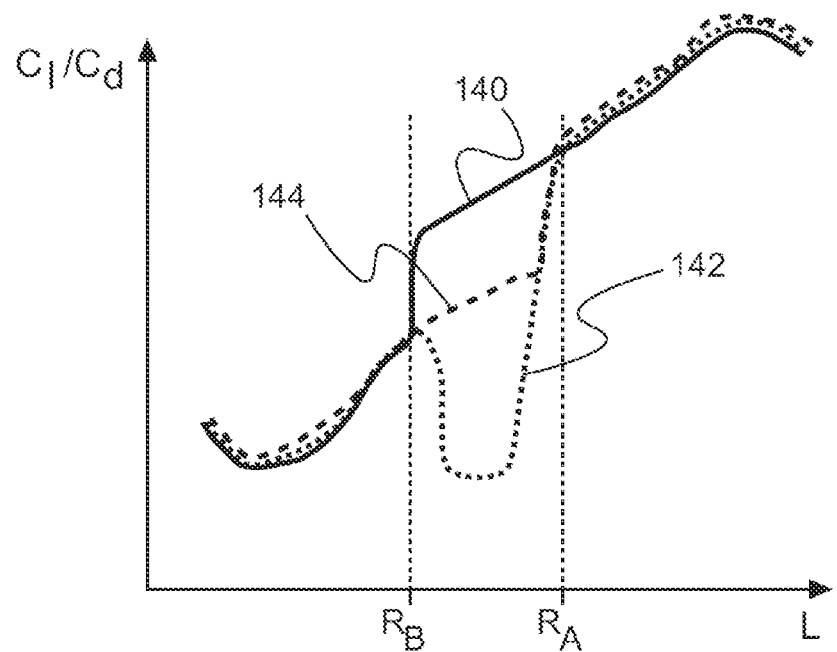
FIG. 7 shows a schematic representation of examples of variations of lift-to-drag ratios for differing turbulence classes.

FIG. 7 shows a schematic representation of examples of variations 140, 142, 144 of lift-to-drag ratios $c_l/c_d$, i.e., a quotient of a lift coefficient $c_l$ to a drag coefficient $c_d$ for differing turbulence classes "A" and "B". The lift-to-drag coefficient $c_l/c_d$ is plotted on the vertical axis. The length L of the rotor blade 108 is plotted on the horizontal axis. The variations 140, 142, 144 correspond to the operating conditions already described with respect to FIGS. 5 and 6.

Thus, a decrease in the tip-speed ratio λ, which results from the lowering of the rated rotor speed, results in an increase in the angle of attack $\alpha_{eff}$, which is illustrated by the variation 130 in FIG. 5. The increase in the angle of attack $\alpha_{eff}$ is in this case greater the closer a profile section of the rotor blade 108 moves from the blade tip 116 towards the blade root 114. In the case of a generally usual design of a rotor blade, the decrease in the tip-speed ratio thus results in an associated increase in the angle of attack $\alpha_{eff}$, as shown by the variation 130 in FIG. 5, such that maximally permissible angles of attack would be exceeded. Flow separation is accompanied by a collapse of the lift coefficient $c_l$, as shown by the variation 136 according to FIG. 6, and by a collapse of the lift-to-drag ratio $c_l/c_d$ due to the increase in the flow drag coefficient $c_d$, which is illustrated by the variation 142 according to FIG. 7. Both circumstances result in significant power losses, which according to the invention is to be avoided. On the other hand, an increase in the tip-speed ratio results in a reduction in the angle of attack $\alpha_{eff}$, such that the risk of flow separation diminishes from the rotor blade root 114. The radial extent of vortex generators may be reduced, which may result in an increase in power.

The lowering of the rated rotor speed and the associated increases in the angle of attack $\alpha_{eff}$ may be responded to by simultaneously raising the blade angle, or pitch angle. Raising the pitch angle has the effect of preventing flow separation and the associated loss of power. However, raising the pitch angle also results in an undesirable, although lesser, loss of power. Alternatively, raising the rated rotor speed and the associated reduction in the angle of attack $\alpha_{eff}$ may be responded to by simultaneously lowering the blade angle, or pitch angle. Lowering the pitch angle may result in an increase in the yield of the installation.

Also provided are techniques for achieving the lowering of the rated rotor speed for the purpose of load reduction in a transition of operation from the lower turbulence class to the higher turbulence class, in a manner that is as neutral as possible in respect of yield. For this purpose, it is provided to determine the rotor blades 108 the number and positioning of the vortex generators 118, in particular their radial extent starting from the rotor blade root 114 in the direction of the rotor blade tip 116, in dependence on the determined turbulence class "A", "B" or "C".

The radial extent of the arrangement of the vortex generators 118 beyond the position RB up to the position $R_A$ causes the profile sections that have vortex generators 118 to have a worse lift-to-drag ratio $c_l/c_d$ due to an increase in the resistance in the region between the position $R_B$ and $R_A$, as shown in FIG. 7 by the comparison of the variation 140, during operation in turbulence class "B", with the variation 144, of operation in turbulence class "A". In the region between position RB and position RA, however, the variation 144 is significantly above the variation 142 for operation in turbulence class "A" without adaptation of the radial extent of the vortex generators 118. In respect of yield, therefore, in an exemplary wind power installation 100, the measure of the radial extent of the arrangement of the vortex generators 118 adapted to the turbulence class "A" is preferable to the measure of unchanged assignment of vortex generators 118 to the rotor blade 108 and raising of the pitch angle.

Figure 8:
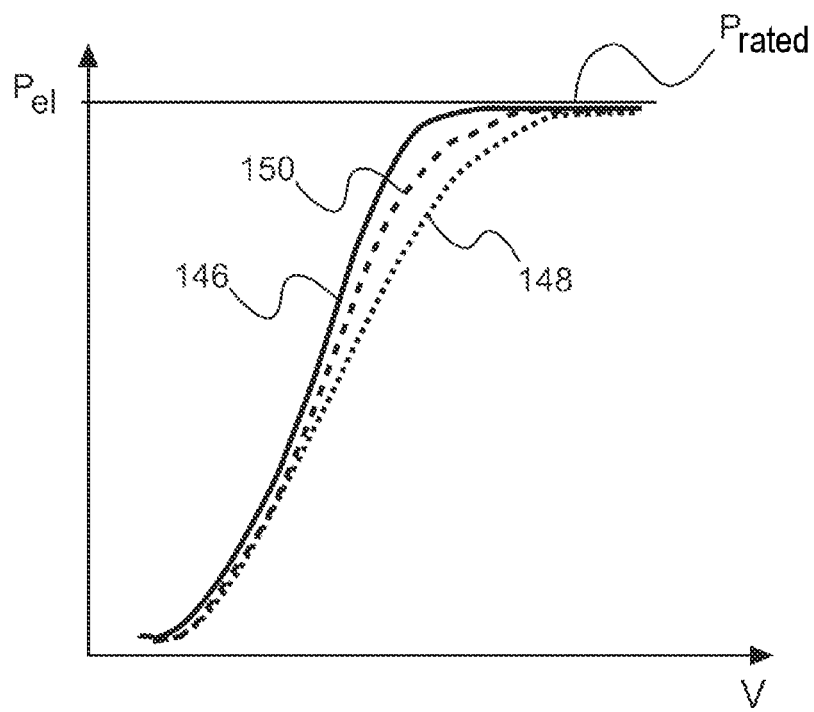
FIG. 8 shows a schematic representation of examples of variations of power curves during operation of the wind power installation in differing turbulence classes.

FIG. 8 shows a schematic representation of examples of variations of power curves 146, 148, 150 in the case of operation of the wind power installation 100 in differing turbulence classes "A" and "B", plotted over the wind speed v. The variation 146 shows the power curve obtained in the case of operation of the wind power installation 100 in turbulence class "B". The vortex generators 118 extend in the radial direction maximally up to the position $R_B$. The variation 148 shows the power curve obtained in the case of operation of the wind power installation 100 in turbulence class "A". The vortex generators 118 in this case extend unchanged in the radial direction maximally up to the position $R_B$. The variation 150 shows the power curve obtained in the case of operation of the wind power installation 100 in turbulence class "A", the radial extent of the vortex generators 118 having been extended up to the position $R_A$, in dependence on the determined turbulence class "A". The latter variation of the power curve 150 is based on operation that differs from operation in turbulence class "B" in that it has a reduced pitch angle.

Figure 9:
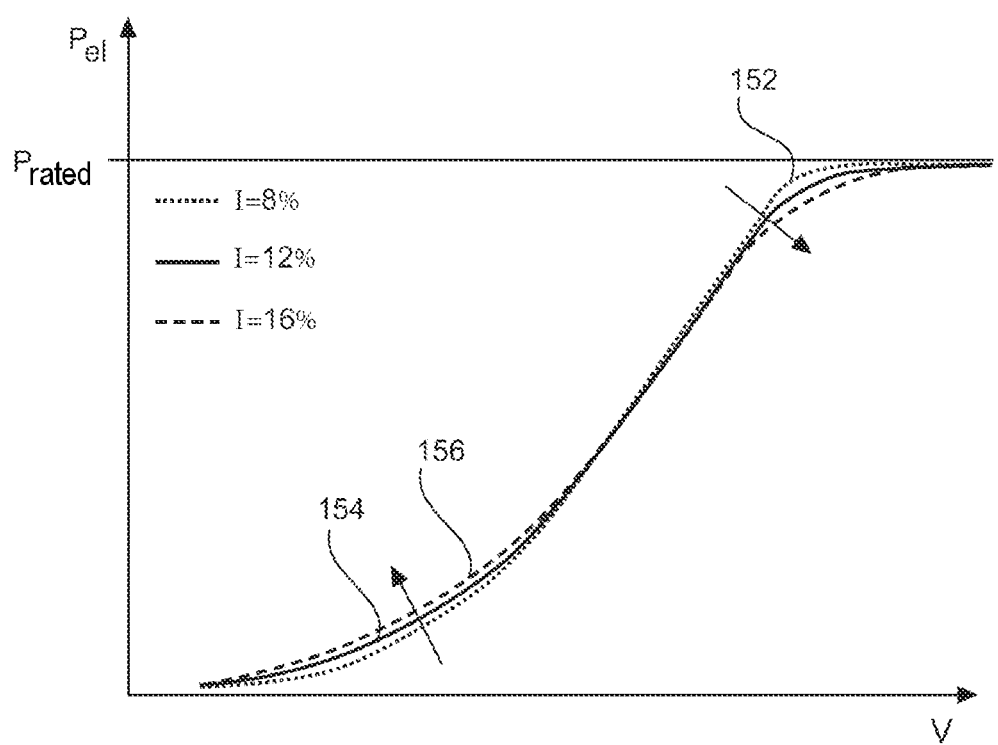
FIG. 9 shows a schematic representation of examples of variations of power curves at differing turbulence intensities.

FIG. 9 shows a schematic representation of examples of variations 152, 154, 155 of determined power curves for differing turbulence intensities $I_{15}$. The variation 152 of a power curve represented as a dotted line is a function of a low turbulence intensity $I_{15}$, for example 8%. The variation 154 of a power curve represented as an unbroken line is a function of a medium turbulence intensity $I_{15}$, for example 12%. The variation 156 of a power curve represented as a dashed line is a function of a high turbulence intensity $I_{15}$, for example 16%. The exemplary variations 152, 154, 156 of the power curves are a function of the turbulence intensity $I_{15}$ of the wind field, such that, in the partial load range, more power is generated at higher turbulence intensities $I_{15}$, and less power $P_{el}$ is generated in the range toward the rated load $P_{rated}$. As described, the wind field is characterized by a large number of parameters. The most important wind field parameters are average wind speed, turbulence, vertical and horizontal shear, wind direction change over height, oblique incident flow and air density. Rated load is, in particular, a load acting upon the wind power installation at which the wind power installation generates rated electrical power.

Especially in the case of wind power installations 100 that are operated at low average wind speeds v, this effect may result, due to the increased frequency of low wind speeds v, in the wind power installation 100 delivering more yield at higher turbulence intensities Its than at lower turbulence intensities $I_{15}$.

Thus, by creating power curves 152, 154, 156 as a function of turbulence, it is possible to take account of the fact that, in the case of low average wind speeds, operation of the wind power installation 100 in the higher turbulence class "A" generates a higher yield than in the lower turbulence class "B". Thus, the yield loss caused by the reduction in rated rotational speed can be further reduced in the method according to the invention and, if necessary, compensated completely.

The invention is implemented on variable-speed, pitch-angle-controlled wind power installations 100 that are operated in differing turbulence classes "A", "B", "C" and that, by means of a closed-loop control system 200, are capable of taking account of the rated rotor speed, or the torque and/or the pitch angle, in the open-loop or closed-loop control of the wind power installation 100. The invention enables an almost or completely yield-neutral reduction, or compensation, of installation loads of a pitch-angle-controlled, variable-speed wind power installation 100 in the case of a transition from turbulence classes having a lower to higher turbulence intensity, from turbulence class "C to turbulence class "B", or from turbulence class "B" to turbulence class "A", by lowering of the rated rotor speed. In addition, the use of a site-dependent vortex generator assignment may be provided, with the radial extent of the vortex generators 118 being determined in dependence on the turbulence class "A", "B" or "C" determined at the site. Alternatively, in the case of a transition from a higher to a lower turbulence class, the yield of the installation may be increased by increasing the rated rotor speed and simultaneously reducing the blade angle and/or radial extent of any vortex generators present.

Effecting the configuration of the radial extent of the vortex generators 118 in dependence on site is also expedient in another respect. A decrease in the air density has physically the same effects as lowering of the rated rotor speed. In this case, when a decrease in the air density occurs, the pitch angle is also raised, starting from a certain power, in order to avoid a flow separation on the rotor blade 108 and thus significant yield losses. Likewise, as already explained further above, the less severe yield losses due to the pitching-out may optionally be further minimized if an assignment of the vortex generators is provided that is adapted to the air density prevailing at the site of the wind power installation 100. This is effected by making the radial extent of the vortex generators dependent on the air density determined at the site, such that the increase in the pitch angle is less pronounced, or may even be omitted altogether, which results in a higher yield. For a site-specific increase in yield, an arrangement of vortex generators that is dependent on air density may be provided.

The invention claimed is:

1. A method comprising:
    determining a turbulence class from a plurality of turbulence classes at a site of a wind power installation, wherein the wind power installation has an aerodynamic rotor having a plurality of rotor blades with adjustable blade angles, and
    operating the wind power installation depending on the determined turbulence class such that the wind power installation is operated in accordance with a power curve associated with the determined turbulence class,
    wherein the determined turbulence class is a higher turbulence class than the wind power installation was previously being operated at, wherein operating the wind power installation in accordance with the power curve associated with the determined turbulence class comprises adjusting a rated rotor speed to a lowered rated rotor speed.

2. A method comprising:
    determining a turbulence class from a plurality of turbulence classes at a site of a wind power installation, wherein the wind power installation has an aerodynamic rotor having a plurality of rotor blades with adjustable blade angles,
    determining quantities and positions for a plurality of vortex generators on the plurality of rotor blades in dependence on the determined turbulence class, coupling the determined quantities of vortex generators to the plurality of rotor blades at the positions, wherein the positions are between regions of rotor-blade roots and rotor-blade tips, and operating the wind power installation depending on the determined turbulence class such that the wind power installation is operated in accordance with a power curve associated with the determined turbulence class, wherein the determined turbulence class is a higher turbulence class than the wind power installation was previously being operated at, wherein operating the wind power installation in accordance with the power curve associated with the determined turbulence class comprises adjusting a rated rotor speed to a lowered rated rotor speed.

3. A method comprising:
operating a wind power installation in a first turbulence class at a site of the wind power installation, wherein the operating is in accordance with a first power curve, wherein the wind power installation has an aerodynamic rotor having a plurality of rotor blades adjustable blade angles, determining a second turbulence class at the site of the wind power installation, operating the wind power installation at the second turbulence class, wherein the operating the wind power installation at the second turbulence class includes operating the wind power installation in accordance with a second power curve that is different from the first power curve, wherein the second turbulence class is a higher turbulence class than the first turbulence class, wherein operating the wind power installation in accordance with the second power curve associated with the second turbulence class comprises adjusting a rated rotor speed to a lowered rated rotor speed.

4. A method comprising:
determining a turbulence class from a plurality of turbulence classes at a site of a wind power installation, wherein the wind power installation has an aerodynamic rotor having a plurality of rotor blades with adjustable blade angles, operating the wind power installation depending on the determined turbulence class such that the wind power installation is operated in accordance with a power curve associated with the determined turbulence class, which includes adjusting a rated rotor speed of the wind power installation in dependence on the turbulence class, wherein the determined turbulence class is a higher turbulence class than the wind power installation was previously being operated at, wherein operating the wind power installation in accordance with the power curve associated with the determined turbulence class comprises adjusting the rated rotor speed to a lowered rated rotor speed.

5. The method as claimed in claim 1, wherein the turbulence class is determined based on a turbulence intensity measured at the wind power installation.

6. The method as claimed in claim 5, wherein operating the wind power installation includes compensating for loads to be expected on the rotor due to the measured turbulence intensity.

7. The method as claimed in claim 1, wherein the plurality of turbulence classes include turbulence class "A", turbulence class "B", and turbulence class "C".

8. The method as claimed in claim 7, wherein each turbulence class includes an associated rated rotor speed, wherein the rated rotor speed is lower for turbulence class "A" than for turbulence class "B", and lower for turbulence class "B" than for turbulence class "C".

9. The method as claimed in claim 1, wherein a plurality of vortex generators are arranged on each of the plurality of rotor blades between a region of a rotor-blade root and a region of a rotor-blade tip, wherein a quantity and a position of the plurality of vortex generators from the rotor-blade root in a direction of the rotor-blade tip of each rotor blade is determined in dependence on the determined turbulence class.

10. The method as claimed in claim 9, wherein the quantity and the position of the plurality of vortex generators along the rotor blade is determined in dependence on an air density at the site.

11. The method as claimed in claim 10, wherein a radial arrangement of the plurality of vortex generators along each rotor blade is determined in dependence on the air density in such a manner that additional yield losses due to an increase in the blade angle necessary at a lower air density are at least partially compensated for.

12. The method as claimed in claim 1, wherein operating the wind power installation further depends on an air density at the site.

13. The method as claimed in claim 1, wherein a blade angle characteristic is defined in dependence on the determined turbulence class.

14. The method as claimed in claim 1, wherein lowering the rated rotor speed includes increasing blade angles for at least one operating point.

15. The method as claimed in claim 14, further comprising counteracting the increased blade angles for the at least one operating point by adjusting shapes and positioning of a plurality of vortex generators, wherein the adjusting shapes and position of the plurality of vortex generators occurs between operation of the wind power installation and in such a manner that lowering of the rated rotor speed remains substantially neutral with respect to yield.

16. The method as claimed in claim 1, wherein further comprising increasing a number of the vortex generators coupled to the rotor blades in a radially outward direction in order.

17. The method as claimed in claim 15, wherein an air density is taken into account in a design and positioning of the plurality of vortex generators.

18. A wind power installation, comprising:
an aerodynamic rotor having a plurality rotor blades with adjustable blade angles;
a closed-loop control system configured to operate the wind power installation according to the method as claimed in claim 1.

19. A wind farm comprising a plurality of wind power installations as claimed in claim 18.

* * * * *